United States Patent
Chen

(10) Patent No.: US 7,628,369 B2
(45) Date of Patent: Dec. 8, 2009

(54) TELESCOPIC TUBE

(75) Inventor: I-Tsen Chen, Taipei (TW)

(73) Assignee: Reliance International Corp., Taipei (TW)

( * ) Notice: Subject to any disclaimer, the term of this patent is extended or adjusted under 35 U.S.C. 154(b) by 320 days.

(21) Appl. No.: 11/653,287

(22) Filed: Jan. 16, 2007

(65) Prior Publication Data

US 2008/0169405 A1 Jul. 17, 2008

(51) Int. Cl.
*A47F 5/00* (2006.01)
(52) U.S. Cl. .................. 248/354.3; 248/354.4; 254/134
(58) Field of Classification Search ............. 248/354.3, 248/354.4, 354.5, 354.6, 354.7, 220.42, 224.8, 248/408, 411, 404; 254/102, 134; 52/118, 52/632; 135/75, 114, 141, 142
See application file for complete search history.

(56) References Cited

U.S. PATENT DOCUMENTS

| | | | | |
|---|---|---|---|---|
| 1,320,613 A | * | 11/1919 | Gilcrease | 248/352 |
| 1,904,656 A | * | 4/1933 | Fellay | 52/112 |
| 5,863,015 A | * | 1/1999 | Hsu | 248/157 |
| 6,698,698 B1 | | 3/2004 | Hsieh et al. | |
| RE40,657 E | * | 3/2009 | Suh | 403/109.3 |
| 2002/0179134 A1 | * | 12/2002 | Suh | 135/141 |
| 2007/0012346 A1 | * | 1/2007 | Choi | 135/114 |
| 2009/0120480 A1 | * | 5/2009 | Takayama | 135/114 |

* cited by examiner

*Primary Examiner*—Alfred Joseph Wujciak, III
(74) *Attorney, Agent, or Firm*—Muncy, Geissler, Olds & Lowe, PLLC

(57) ABSTRACT

A telescopic tube having an outer tube, an adjustable tube, a housing and a locking clamp. The outer tube has a top end. The adjustable tube is mounted slidably in the top end of the outer tube and has multiple locking notches. The housing is attached to the top end of the outer tube, is mounted slidably around the adjustable tube and has a central top hole, a front opening and an inner surface. The locking clamp is mounted movably in the housing and has an elongated through hole, a rear inner surface, a spring and a locking rod. The spring is mounted between the housing and the locking clamp. The locking rod is formed on and protrudes in from the rear inner surface of the elongated through hole and selectively engages a locking notch in the adjustable tube to hold the adjustable tube in place.

9 Claims, 4 Drawing Sheets

TELESCOPIC TUBE

BACKGROUND OF THE INVENTION

1. Field of the Invention

The present invention relates to a telescopic tube, especially to a telescopic tube with a quick release locking mechanism.

2. Description of the Prior Art

A conventional telescopic tube, as disclosed in U.S. Pat. No. 6,698,698, is used in a stand to make the stand's height adjustable but either comprises a numerous parts in a complex structure or is susceptible to unpredictable and unexpected malfunction. The complex structure and numerous parts make the conventional telescopic tube difficult to fabricate.

To overcome the shortcomings, the present invention provides a telescopic tube to mitigate or obviate the aforementioned problems.

SUMMARY OF THE INVENTION

The main objective of the invention is to provide a telescopic tube that can be easily fabricated and is robust.

The telescopic tube in accordance with the present invention has an outer tube, an adjustable tube, a housing and a locking clamp. The outer tube has a top end. The adjustable tube is mounted slidably in the top end of the outer tube and has multiple locking notches. The housing is attached to the top end of the outer tube, is mounted slidably around the adjustable tube and has a central top hole, a front opening and an inner surface. The locking clamp is mounted movably in the housing and has an elongated through hole, a rear inner surface, a spring and a locking rod. The spring is mounted between the housing and the locking clamp. The locking rod is formed on and protrudes in from the rear inner surface of the elongated through hole and selectively engages a locking notch in the adjustable tube to hold the adjustable tube in place.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
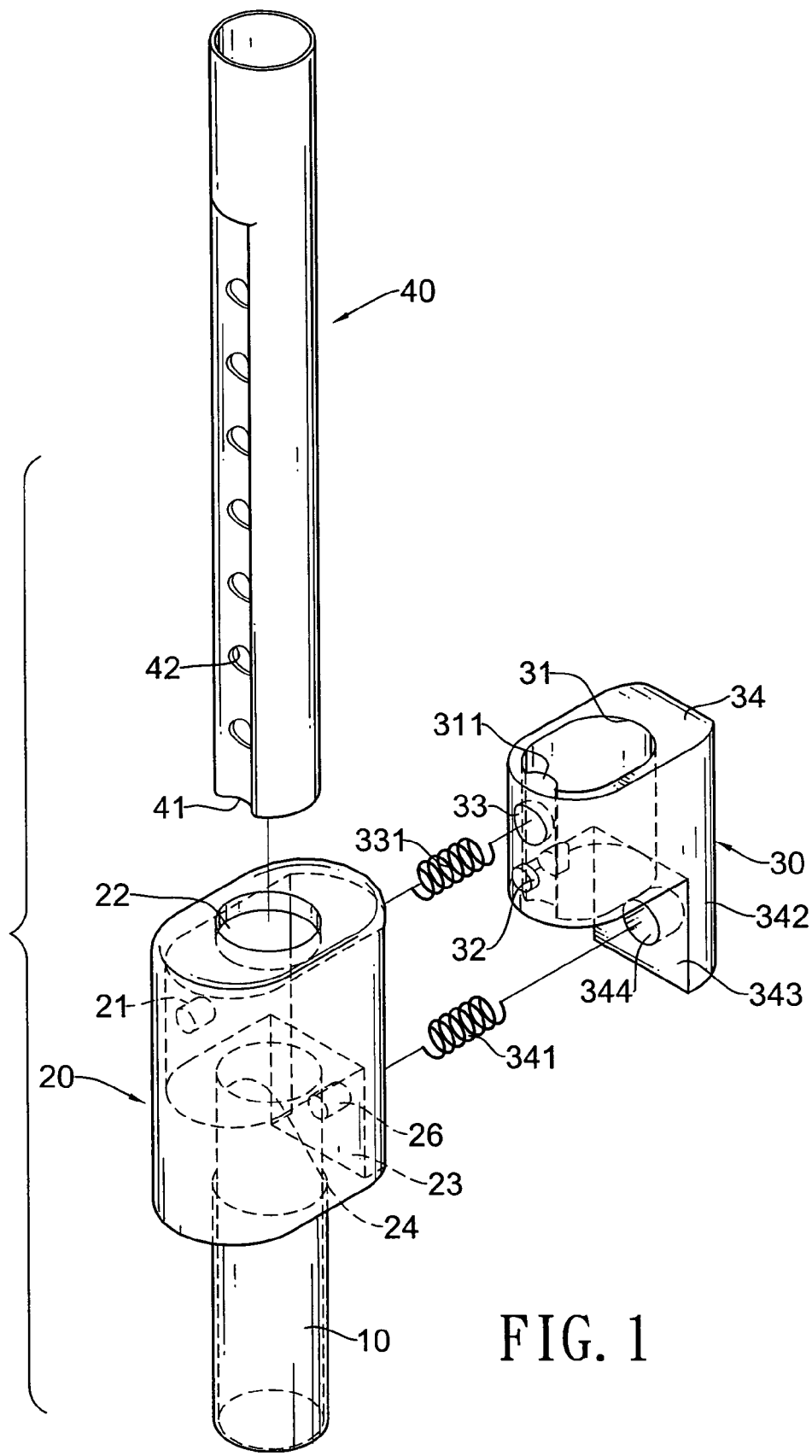
FIG. 1 is an exploded perspective view of a telescopic tube in accordance with the present invention.
Figure 2:
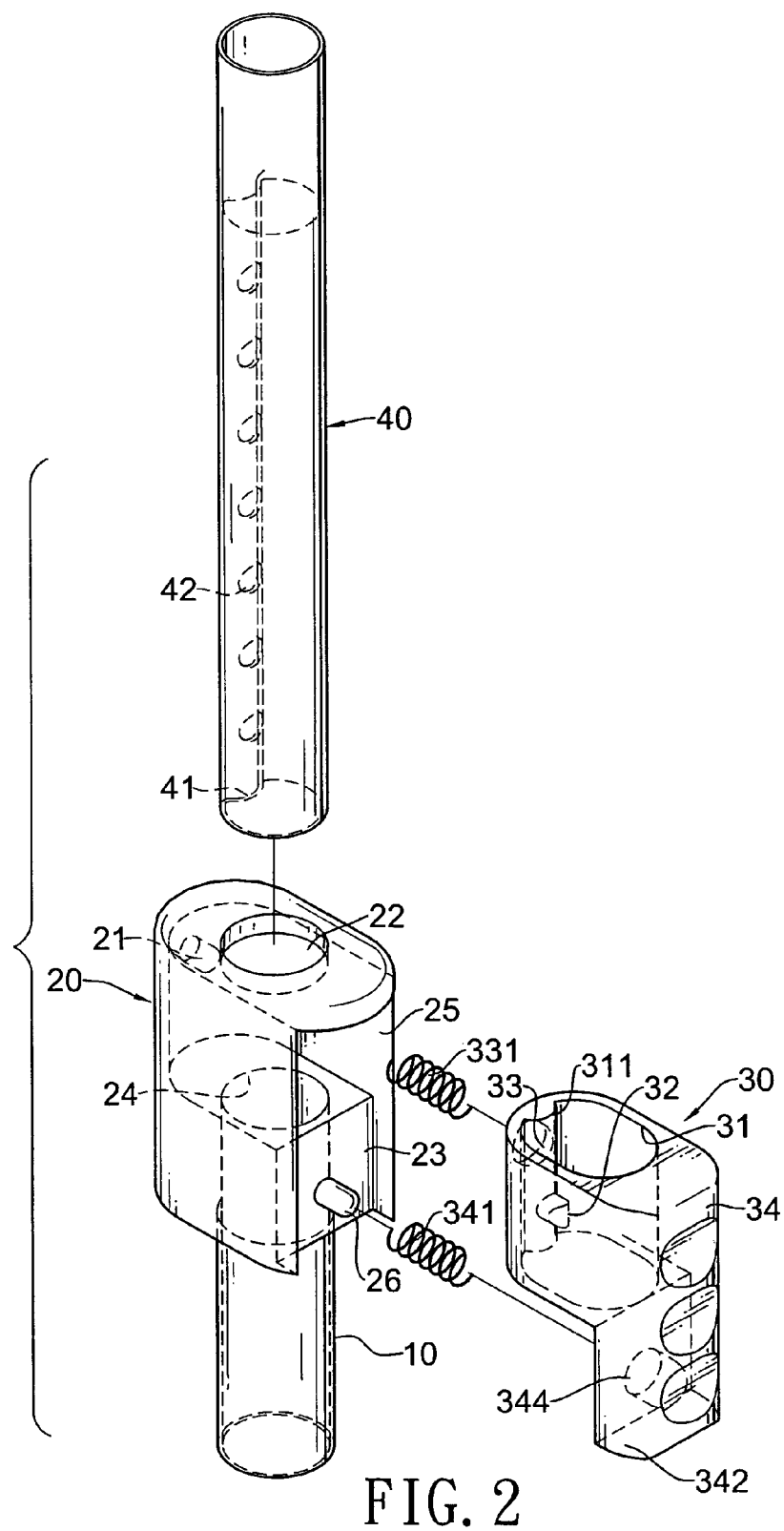
FIG. 2 is another exploded perspective view of the telescopic tube in FIG. 1.
Figure 3:
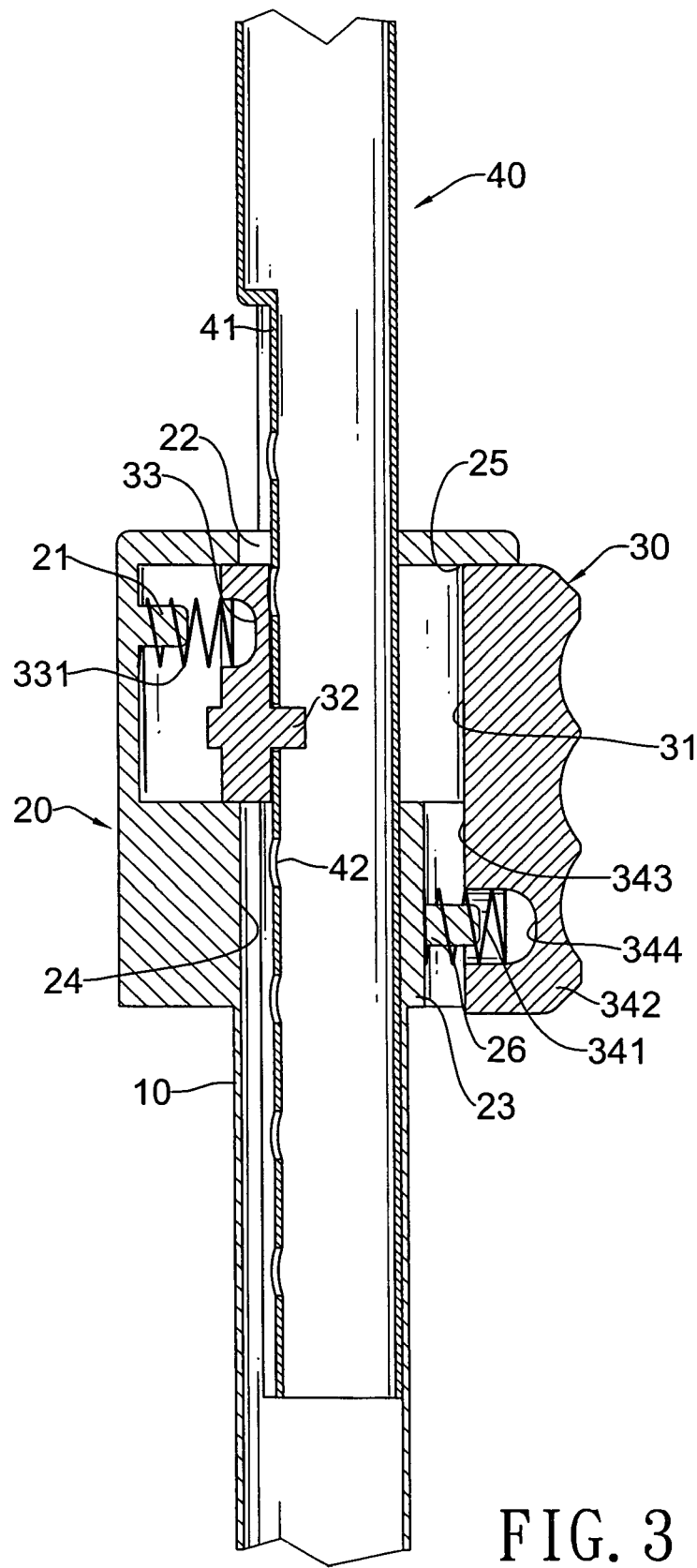
FIG. 3 is a cross sectional side view of the telescopic tube in FIG. 1.

With reference to FIGS. 1, 2 and 3, a telescopic tube in accordance with the present invention comprises an outer tube (10), an adjustable tube (40), a housing (20) and a locking clamp (30).

The outer tube (10) has a top end.

The adjustable tube (40) is mounted slidably in the top end of the outer tube (10) and has a distal end, a proximal end, an outer surface, a longitudinal groove (41) and multiple locking notches (42). The outer surface has a rear face. The longitudinal groove (41) is formed in the rear face of the outer surface from the proximal end to near the distal end. The locking notches (42) are formed in the outer surface of the adjustable tube (40) in the longitudinal groove (41).

The housing (20) is attached to the top end of the outer tube (10) slidably around the adjustable tube (40) and has an inner space, a rear inner surface, an upper mounting post (21), a central top hole (22), a bottom plug (23), a central bottom hole (24) and a front opening (25).

The inner space communicates with the outer tube (10).

The upper mounting post (21) is formed on the rear inner surface of the housing (20) and protrudes into the inner space.

The central top hole (22) is mounted slidably around the adjustable tube (40) and communicates with the inner space.

The bottom plug (23) has a front surface and a lower mounting post (26).

The lower mounting post (26) is formed on and protrudes from the front surface of the bottom plug (23).

The central bottom hole (24) is defined through the bottom plug (23), communicates with the inner space, is mounted securely around the outer tube (10) and aligns with the central top hole (22). The front opening (25) communicates with the inner space.

The locking clamp (30) is mounted slidably in the inner space of the housing (20) around the adjustable tube (40), selectively holds the adjustable tube (40) in position relative to the outer tube (10) and has an elongated through hole (31), a locking rod (32), a rear outer surface, a front outer surface, a upper mounting recess (33), a rear spring (331), a grip pad (34) and a front spring (341).

The elongated through hole (31) is mounted around the adjustable tube (40) has a rear inner surface and a longitudinal rib (311).

The longitudinal rib (311) is formed longitudinally on the rear inner surface of the elongated through hole (31) and corresponds to the longitudinal groove (41) in the adjustable tube (40).

Figure 4:
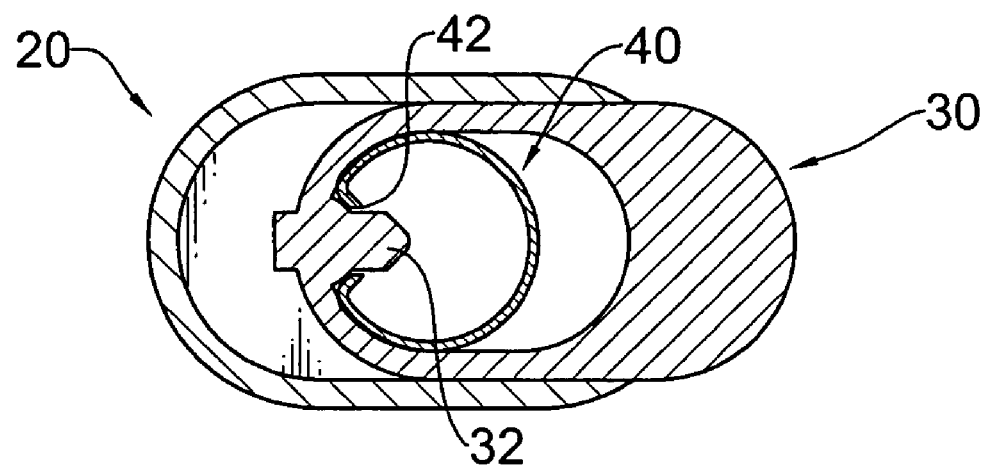
FIG. 4 is an operational cross sectional top view of the telescopic tube in FIG. 1 with the telescopic tube locked in place.
Figure 5:
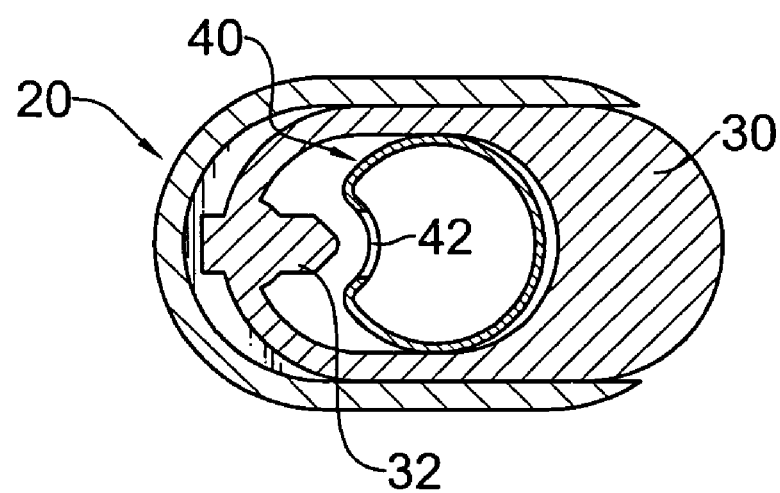
FIG. 5 is an operational cross sectional top view of the telescopic tube in FIG. 1 with the telescopic tube released for adjustment.

With further reference to FIG. 4, the locking rod (32) is formed on and protrudes in from the rear inner surface of the elongated through hole (31), may be formed on the longitudinal rib (311) of the elongated through hole (31) and selectively engages one of the locking notches (42) to hold the adjustable tube (40) in position relative to the outer tube (10). With further reference to FIG. 5, the locking rod (32) disengages from the locking notches (42) when the locking clamp (30) is squeezed so the adjustable tube (40) can be moved relative to the outer tube (10). Releasing the locking clamp (30) causes the locking rod (32) to engage another locking notch (42).

The upper mounting recess (33) is defined in the rear outer surface of the locking clamp (30) and is aligned with the upper mounting post (21).

The rear spring (331) is mounted between the housing (20) and the locking clamp (30), presses the locking clamp (30) forward to hold the locking rod (32) in a selected locking notch (42) and has a stationary end and a movable end. The stationary end is attached to the rear inner surface of the housing (20) and may be attached to the upper mounting post (21). The movable end is attached to the rear outer surface of the locking clamp (30) and may be mounted in the upper mounting recess (33).

The grip pad (34) is attached to the front outer surface of the locking clamp (30) and has a bottom edge, a rear surface (343), a lip (342) and a lower mounting recess (344). The lip (342) is formed on and protrudes down from the bottom edge of the grip pad (34) flush with the rear surface (343) and corresponds to the front surface of the bottom plug (23). The lower mounting recess (344) is formed in the rear surface (343) in the lip (342) and corresponds to the lower mounting post (26) on the bottom plug (23).

The front spring (341) is mounted between the housing (20) and the locking clamp (30), presses the locking clamp (30) forward and has a stationary end and a movable end. The stationary end of the front spring (341) is attached to the front surface of the bottom plug (23) of the housing (20) and may be mounted on the lower mounting post (26). The movable end of the front spring (341) is attached to the rear surface (343) of the lip (342) of the grip pad (34) and may be mounted in the lower mounting recess (344).

The telescopic tube as described has a small number of parts and a simple structure, which makes the telescopic tube robust and easy to fabricate.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A telescopic tube with a quick release locking mechanism comprising
    an outer tube having a top end;
    an adjustable tube being mounted slidably in the top end of the outer tube and having
        a distal end;
        a proximal end;
        an outer surface having a rear face; and
        multiple locking notches being formed in the outer surface of the adjustable tube;
    a housing being attached to the top end of the outer tube slidably around the adjustable tube and having
        an inner space communicating with the outer tube, wherein a bottom portion of housing is mounted on top end of outer tube;
        a rear inner surface;
        a central top hole being mounted slidably around the adjustable tube and communicating with the inner space;
        a bottom plug located in and adjacent bottom portion of housing, having a front surface;
        a central bottom hole being defined through the bottom plug;
        communicating with the inner space, being mounted securely around the outer tube and aligning with the central top hole; and
        a front opening communicating with the inner space; and
    a locking clamp being mounted slidably in the inner space of the housing and around the adjustable tube, selectively holding the adjustable tube in position relative to the outer tube and having
        an elongated through hole being mounted around the adjustable tube and having a rear inner surface;
        a locking rod being formed on and protruding in from the rear inner surface of the elongated through hole and selectively engaging one of the locking notches;
        a rear outer surface facing the rear inner surface of the housing;
        a front outer surface facing opposite the rear outer surface; and
    a rear spring being mounted between the housing and the locking clamp, pressing the locking clamp forward to hold the locking rod in a selected locking notch and having
        a stationary end being attached to the rear inner surface of the housing; and
        a movable end being attached to the rear outer surface of the locking clamp.

2. The telescopic tube as claimed in claim 1, wherein
    the adjustable tube further has a longitudinal groove formed in the rear face of the outer surface from the proximal end to near the distal end; and
    the locking notches are formed in the longitudinal groove.

3. The telescopic tube as claimed in claim 1, wherein
    the housing further has an upper mounting post formed on the rear inner surface of the housing and protruding into the inner space; and
    the stationary end of the rear spring is attached to the upper mounting post.

4. The telescopic tube as claimed in claim 1, wherein
    the housing further has an upper mounting recess defined in the rear outer surface of the locking clamp; and
    the movable end of the spring is mounted in the upper mounting recess.

5. The telescopic tube as claimed in claim 1, wherein the locking clamp further has a grip pad attached to the front outer surface of the locking clamp and has
    a bottom edge; and
    a rear surface.

6. The telescopic tube as claimed in claim 2, wherein
    the locking clamp further has a longitudinal rib formed longitudinally on the rear inner surface of the elongated through hole and corresponding to the longitudinal groove in the adjustable tube; and
    the locking rod is formed on the longitudinal rib.

7. The telescopic tube as claimed in claim 3, wherein
    the housing further has an upper mounting recess defined in the rear outer surface of the locking clamp and aligned with the upper mounting post; and
    the movable end of the spring is mounted in the upper mounting recess.

8. The telescopic tube as claimed in claim 5, wherein
    the grip pad further has a lip formed on and protruding down from the bottom edge of the grip pad flush with the rear surface and corresponding to the front surface of the bottom plug; and
    the locking clamp further has a front spring mounted between the housing and the locking clamp, pressing the locking clamp forward and having
    a stationary end attached to the front surface of the bottom plug; and
    a movable end attached to the rear surface of the lip.

9. The telescopic tube as claimed in claim 8, wherein
    the bottom plug of the housing further has a lower mounting post formed on and protruding from the front surface of the bottom plug;
    the grip pad further has a lower mounting recess formed in the rear surface in the lip and corresponding to the lower mounting post on the bottom plug;
    the stationary end of the front spring is mounted on the lower mounting post; and
    the movable end of the front spring is mounted in the lower mounting recess.

* * * * *